US012566992B2

(12) United States Patent
Chandroliya et al.

(10) Patent No.: US 12,566,992 B2
(45) Date of Patent: Mar. 3, 2026

(54) QUANTUM-COMPUTING-POWERED SYSTEM WITH MULTI-DIMENSIONAL SCALING FOR DATABASE BACKUP, SEARCH, AND RECOVERY

(71) Applicant: Bank of America Corporation, Charlotte, NC (US)

(72) Inventors: Vimal Chandroliya, Gujarat (IN); Magaranth Jayasingh, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 818 days.

(21) Appl. No.: 17/961,609

(22) Filed: Oct. 7, 2022

(65) Prior Publication Data

US 2024/0119338 A1 Apr. 11, 2024

(51) Int. Cl.
| | |
|---|---|
| *G06N 10/80* | (2022.01) |
| *G06F 16/21* | (2019.01) |
| *G06F 16/22* | (2019.01) |
| *G06F 16/2453* | (2019.01) |
| *G06N 10/20* | (2022.01) |

(52) U.S. Cl.
CPC ........... *G06N 10/80* (2022.01); *G06F 16/219* (2019.01); *G06F 16/2255* (2019.01); *G06F 16/24542* (2019.01); *G06N 10/20* (2022.01)

(58) Field of Classification Search
CPC ............. G06F 16/219; G06F 16/24542; G06F 16/2255; G06N 10/80; G06N 10/20; G06N 5/01; G06N 10/00

USPC ................................................... 707/640, 713
See application file for complete search history.

(56) References Cited

U.S. PATENT DOCUMENTS

| | | | |
|---|---|---|---|
| 6,954,834 | B2 | 10/2005 | Slater et al. |
| 10,216,431 | B2 | 2/2019 | Hildebrand et al. |
| 10,528,433 | B2 | 1/2020 | Protasov et al. |
| 11,366,808 | B2* | 6/2022 | Zhou .................. G06F 16/24539 |
| 2003/0014605 | A1* | 1/2003 | Slater ..................... G11B 20/10 |
| | | | 714/E11.12 |
| 2007/0239366 | A1 | 10/2007 | Hilton et al. |
| 2009/0077001 | A1* | 3/2009 | Macready ................ G06N 5/02 |
| | | | 706/57 |

(Continued)

*Primary Examiner* — Shahid A Alam
(74) *Attorney, Agent, or Firm* — Weiss & Arons LLP

(57) ABSTRACT

A method for database backup, search, and recovery using a quantum-computing-powered system with multi-dimensional scaling is provided. The method may include storing a first dataset in a first local database, generating a second dataset from a critical subset of the first dataset, and storing the second dataset in a second remote, cloud-based, database. The method may include receiving a search query at the first database. The method may include receiving a first indication of an outage at the first database and, in response to the first indication, routing the search query to a quantum processor and executing the search on the second dataset. The method may include receiving a second indication of a loss of data from the first dataset at the first database, and, in response to the second indication, restoring the critical subset of the first dataset to the first database from the second dataset at the second database using the quantum processor. The method may include automatically scaling the quantum processor during a processing task.

20 Claims, 7 Drawing Sheets

(56) References Cited

U.S. PATENT DOCUMENTS

| 2013/0218833 A1* | 8/2013 | North | G06F 16/254 |
| | | | 707/610 |
| 2015/0154255 A1* | 6/2015 | Cole | G06F 16/24542 |
| | | | 707/718 |
| 2017/0357692 A1 | 12/2017 | Su et al. | |
| 2018/0091440 A1* | 3/2018 | Dadashikelayeh | G06N 10/40 |
| 2018/0260245 A1 | 9/2018 | Smith | |
| 2020/0234174 A1* | 7/2020 | Gambetta | G06N 10/60 |
| 2023/0130738 A1* | 4/2023 | Sengupta | G06F 16/2433 |
| | | | 707/718 |
| 2023/0141190 A1* | 5/2023 | Ma | G06F 16/24539 |
| | | | 707/714 |

* cited by examiner

100

101

103 PROCESSOR

105 RAM

107 ROM

115 MEMORY

117 O/S

119 APPLICATIONS

111 DATA

109 I/O

127 MODEM

113 LAN INTERFACE

125 LAN

141 TERMINAL

129 WAN

131 INTERNET

129 WAN

129 WAN

151 TERMINAL

QUANTUM-COMPUTING-POWERED SYSTEM WITH MULTI-DIMENSIONAL SCALING FOR DATABASE BACKUP, SEARCH, AND RECOVERY

FIELD OF TECHNOLOGY

Aspects of the disclosure relate to digital systems. Specifically, aspects of the disclosure relate to quantum-computing-powered systems for database backup, search, and recovery.

BACKGROUND OF THE DISCLOSURE

It is commonplace for corporations, financial institutions, and other private, public, and government entities to store tremendous amounts of data. The data is often crucial to support essential functions. The functions may, for example, relate to business, security, and other suitable functions.

It is often desirable for the data to be backed up. Backing up the data may be especially useful in scenarios where the primary data store experiences an outage or a data loss. Having the data backed up may provide coverage for the entity during the outage and may facilitate restoration of the data after the data loss.

However, data access and data restoration from a backup data store is typically associated with considerable delays. The delays may cause financial and/or physical harm when the data is necessary for critical system functions.

It would be desirable, therefore, to provide systems and methods for improved database backup, search, and recovery.

SUMMARY OF THE DISCLOSURE

Aspects of the disclosure relate to quantum-computing-powered systems with multi-dimensional scaling, and associated methods, for database backup, search, and recovery. A system may include a classical processor and a quantum processor. The quantum processor may include a default number of quantum threads. Each quantum thread may include a default number of quantum circuits.

The system may include a machine-learning (ML) engine. The system may include a first database that is a local database. The system may include a second database that is a remote, cloud-based, database.

The system may be configured to store a first dataset in the first database and determine, via the ML engine, a critical subset of the dataset that includes critical data. The system may be configured to generate a second dataset from the critical subset. The system may be configured to store the second dataset in the second database.

The system may be configured to receive a search query at the first database for execution on the first dataset. The system may be configured to generate a first search execution plan suited for the classical processor.

The system may be configured to receive a first indication of an outage at the first database. In response to the first indication, the system may be configured to route the search query to the quantum processor, convert the first search execution plan to a second search execution plan suited for the quantum processor, and/or execute the second search execution plan on the second dataset at the second database via the quantum processor.

The system may be configured to receive a second indication of a loss of data from the first dataset at the first database. In response to the second indication, the system may be configured to restore the critical subset of the first dataset to the first database from the second dataset at the second database using the quantum processor.

The system may be further configured to automatically scale the quantum processor during a processing task. The processing task may be from a list of processing tasks that may include executing the second search execution plan via the quantum processor. The list may also include restoring the critical subset of the first dataset using the quantum processor.

To automatically scale the quantum processor during the processing task, the system may be further configured to add additional quantum circuits to each quantum thread when the processing task is detected to have a duration that is longer than a threshold duration. The system may be further configured to add additional quantum threads when the processing task is detected to have a volume that is larger than a threshold volume.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
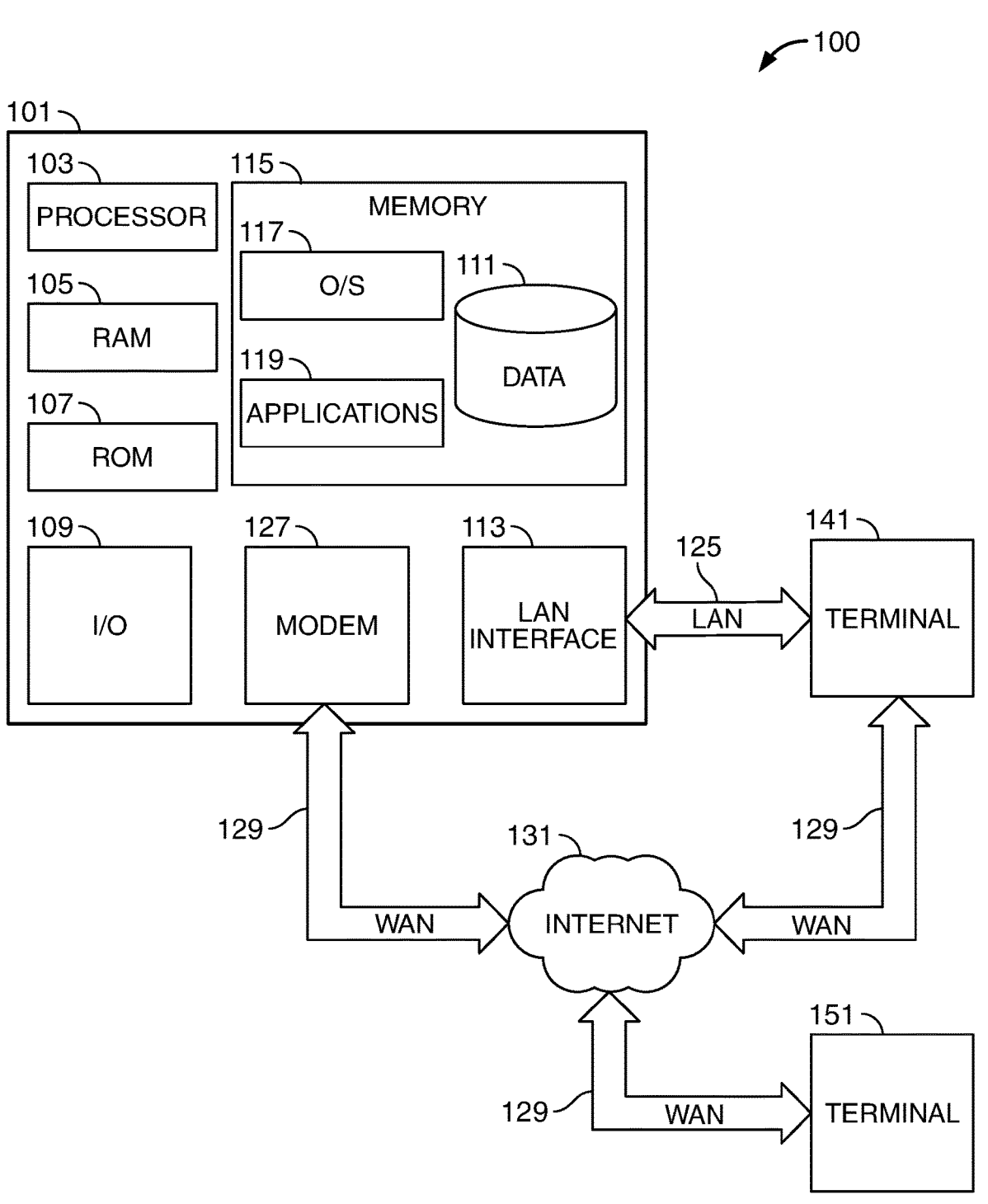
FIG. 1 shows an illustrative system in accordance with principles of the disclosure.

Systems and methods are provided for a quantum-computing-powered system with multi-dimensional scaling for database backup, search, and recovery. The system may include a classical (i.e., non-quantum) processor and a quantum processor. A quantum processor may be used herein to refer to a computing device whose operations can harness aspects of quantum mechanics, such as superposition, interference, and entanglement.

Quantum processors are associated with vastly improved efficiencies over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1. The probabilities can be manipulated using matrix-based quantum gates, which are analogous to classical logic gates. Qubits are therefore able to represent many more data possibilities than a bit-based system of the same size. This allows for greater speed and less memory usage than classical systems.

The quantum processor may include a default number of quantum threads. Each quantum thread may include a default number of quantum circuits. Quantum circuits, in turn, refer to hardware and software based computational models that include quantum gates and are used for executing quantum computations. For example, in some embodiments, at least one of the quantum circuits may include a Toffoli gate. A feature of the Toffoli gate is its universal nature—meaning it is able to represent classical operations as well as quantum. In certain embodiments, at least one of the quantum circuits may include a Hadamard gate. A feature of the Hadamard gate is the ability to represent a superposition state.

The system may include a machine-learning (ML) engine. The system may include a first database that is a local database. The system may include a second database that is a remote, cloud-based, database. System configurations disclosed below may correspond to method steps of the disclosure.

The system may be configured to store a first dataset in the first database. The system may be configured to determine, via the ML engine, a critical subset of the dataset. The critical subset may include some or all of the critical data in the first dataset. The critical data may include tables determined to include critical data. The system may be configured to generate a second dataset from the critical subset. The second dataset may therefore be a copy of the critical data that is in the first dataset. The system may be configured to store the second dataset in the second database.

The system may be configured to receive a search query at the first database. The search query may be for execution on the first dataset. In some embodiments, the search query may be a SQL search query. In other embodiments, the search query may be any suitable query designed to search a database. The system may be configured to generate a first search execution plan. The first search execution plan may be an execution plan suited for the classical processor. The execution plan may include a representation of operations for executing the search. The operations may, for example, include logical search operators. The operations may also include portions of data or data structures on which the operators will be applied.

The system may be configured to receive a first indication of an outage at the first database. An outage may refer, for example, to a reduction or complete loss of electric power, processing power, memory, accessibility, connectivity, or any other suitable performance metric. In response to the first indication, the system may be configured to route the search query to the quantum processor. The system may also convert the first search execution plan to a second search execution plan. The second execution plan may be suited for the quantum processor. A new execution plan tailored for the quantum processor may be appropriate due to the different underlying logic. For example, in certain embodiments, in order to convert the first search execution plan to the second search execution plan, the system may be configured to convert a bit-based search algorithm to a qubit-based search algorithm. As another example, in some scenarios, classical processors may use indexing to execute a search, while quantum processors may use a table scan or search. In yet another example, the second execution plan for suited for the quantum processor may include allocating the number of threads and/or circuits to initialize the quantum processor, a step not applicable to a classical processor.

The system may execute the second search execution plan on the second dataset at the second database via the quantum processor. The system may thereby provide quick and efficient backup performance—on at least the critical data of the system—in response to a system outage.

The system may be configured to receive a second indication of a loss of data. The data lost may be from the first dataset at the first database. The loss of data may be associated with the outage. In some embodiments, the loss of data may be independent of the outage. In response to the second indication, the system may be configured to restore the critical subset of the first dataset at the first database. The restoration may be executed by the quantum processor. The restoration may be based on the second dataset stored at the second database. The system may thereby provide quick and efficient data restoration—on at least the critical data of the system—in response to a loss of data in the system. Moreover, the quantum nature of the backup and/or restoration may be performed on the backend seamlessly and invisibly without the knowledge of the user who submitted the search query.

The system may be further configured to automatically scale the quantum processor during a processing task. The processing task may be from a list of processing tasks that may include executing the second search execution plan via the quantum processor. The list may also include restoring the critical subset of the first dataset using the quantum processor.

To automatically scale the quantum processor during the processing task, the system may be configured to dynamically expand the size of the quantum processor as needed, in real time, during the task. The quantum processor may be initialized with a default size. The default size may include a default amount of hardware and/or software components, or other suitable computing resources, to run the quantum processor. The default size may, for example, be established based on an estimated amount of computing resources needed for a small computing task, which may then be expanded if the task turns out to be larger or more time consuming than expected. Expanding the size of the quantum processor may include utilizing more hardware, software, or other suitable computing resources, to run the quantum processor.

In some embodiments, the quantum processor may be initialized with a size suited for an average task. In yet other embodiments, the default size of the quantum processor may be customized for each task, based on an approximation of the resources needed for that particular task. The scaling may include reducing the size of the quantum processor when the system determines that the task needs less resources than previously provided. In some embodiments, the size of the quantum processor may be dynamically scaled up and down, as needed. The system may therefore provide the crucial and efficient backup and restoration as described herein, with streamlined resources that are precisely tailored and adjusted in real time to the needs of the present task.

In some embodiments, the quantum processor may be scaled differently depending on certain factors. For example, in certain scenarios it may be more appropriate to adjust quantum circuits based on durational considerations but to adjust quantum threads based on data volume considerations. Thus, the system may be configured to add additional quantum circuits to each quantum thread when the processing task is detected to have a duration that is longer than a threshold duration. In contrast, the system may be configured to add additional quantum threads when the processing task is detected to have a volume (e.g., amount of data in active memory) that is larger than a threshold volume.

In some embodiments, the system may be further configured to store a duplicate of the first dataset in a third database. The duplicate may be a full duplicate. In some embodiments, the duplicate may include only non-critical data, or only the portion of the first dataset that was not determined to be part of the critical subset. In response to the second indication, the system may be configured to determine whether the lost data is a part of the critical subset. The system may be configured to restore the lost data to the first database from the duplicate at the third database using a classical processor when the lost data is not part of the critical subset. An advantage of this embodiment may include preserving the resources of the backup quantum system for scenarios involving critical data. Moreover, in some scenarios, using the quantum components of the system may be associated with increased cost, and may therefore be reserved for operations involving critical data.

In some embodiments, the system may be further configured to log, in a cloud-based control file, data stored in the second database. The system may be configured to use the control file as part of the determining whether the lost data is a part of the critical sub set.

In some embodiments, the system may be further configured to, in response to the first indication, determine whether the first search execution plan includes searching for data that is part of the critical subset. The system may be configured to only route the search query to the quantum processor when it is determined that the first search execution plan includes searching for data that is part of the critical subset. An advantage of this embodiment may also include preserving the resources of the backup quantum system for scenarios involving critical data. Moreover, it may be futile, and therefore a waste of resources, to search the second dataset, which is based on the critical subset, when the search query does not involve the critical data in the critical subset.

In some embodiments, the ML engine may determine the critical subset of the first database at least in part using historical data access frequency patterns. In some embodiments, the historical data access frequency patterns may include a threshold access frequency. For example, the system may set a threshold of daily access to be considered critical. Other embodiments, the threshold may be weekly, monthly, or any other suitable threshold access frequency. In some embodiments, the historical data access frequency patterns may include a relative access frequency. For example, the 10% most accessed data may be classified as critical. In other embodiments, any other percentage or suitable relative access frequency may be classified as critical.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to database backup, search, and recovery.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
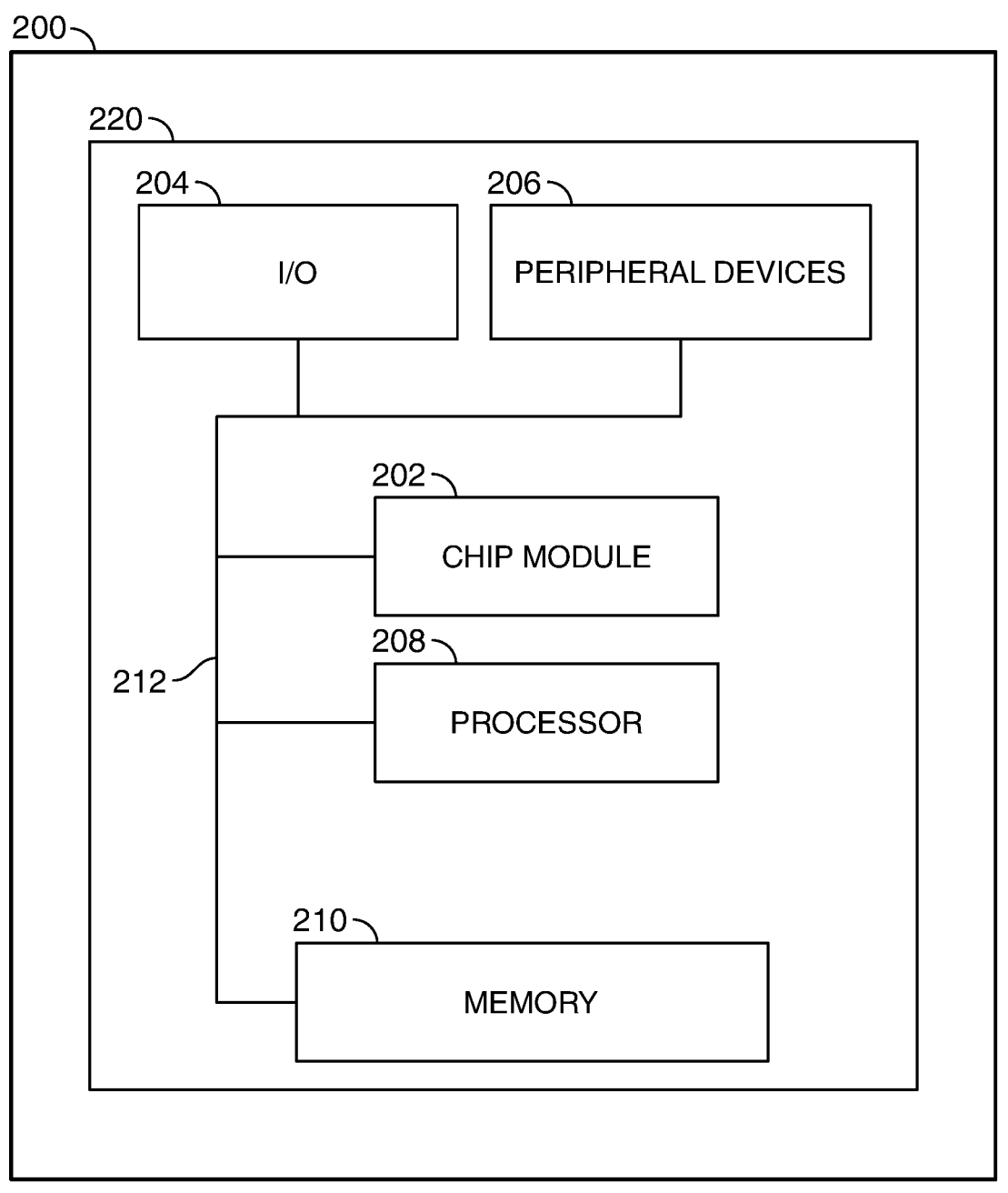
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
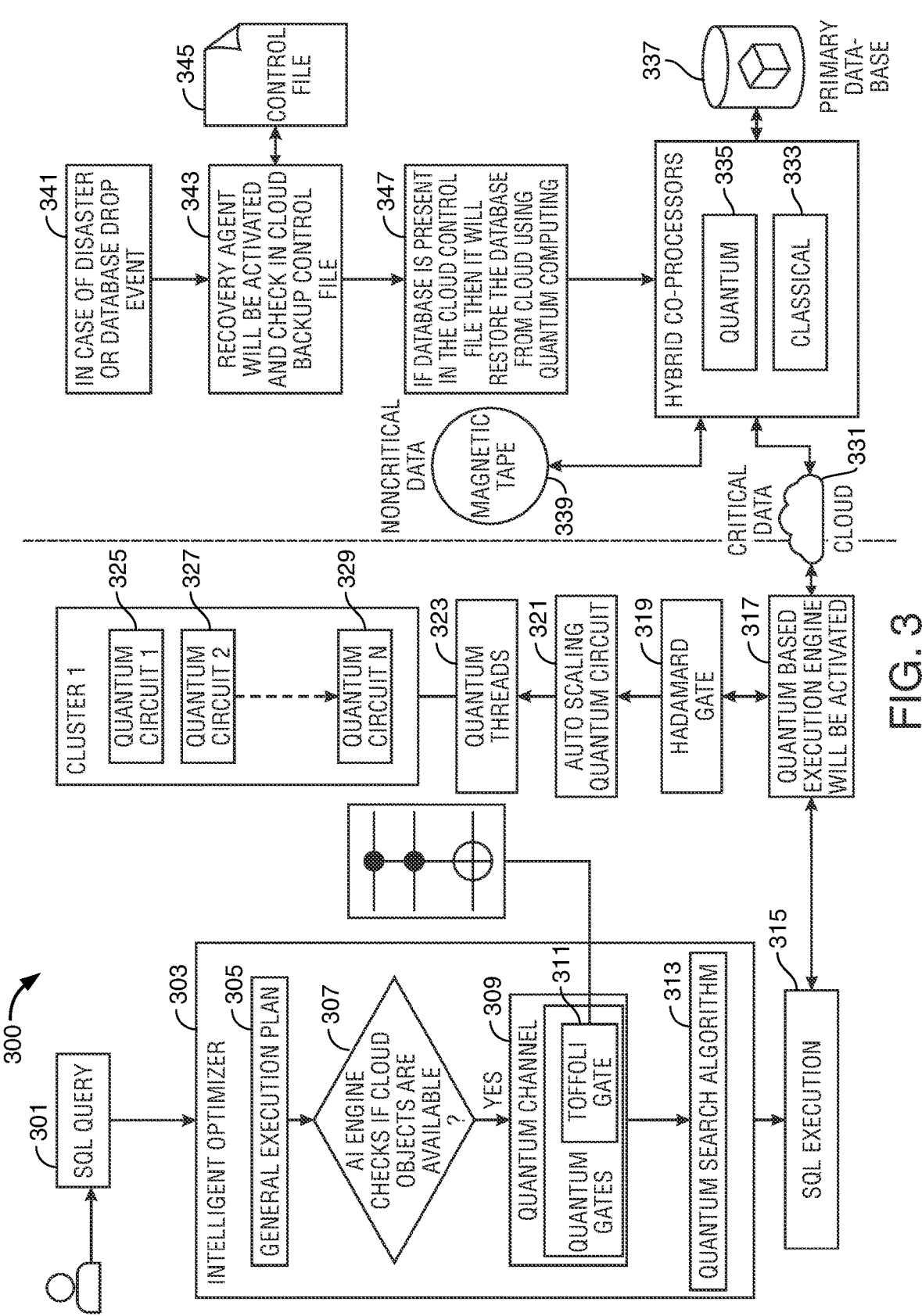
FIG. 3 shows an illustrative diagram in accordance with principles of the disclosure.

FIG. 3 shows illustrative diagram 300 in accordance with principles of the disclosure. Diagram 300 shows architecture and process steps of a quantum-computing-powered system with multi-dimensional scaling for database backup, search, and recovery. A query (e.g., an SQL query) is received at 301. Optimizer 303 processes the query and generates general execution plan 305 that may be suitable for classical processor 333. At 307, the optimizer determines if the query targets exist in the cloud (i.e., the backup cloud-based database 331 for critical data). Step 307 may, in certain embodiments, only be performed when a primary local database is unavailable. In other embodiments, step 307 may be performed even when the primary local database is available. When the target is in the cloud, the query may be routed to quantum channel 309, which may include Toffoli gate 311. The system may generate quantum search algorithm 313 and execute the query, at 315, on quantum processor 335, which may be activated at 317 for the query. The quantum processor may include Hadamard gate 319. The quantum processor may include automatic scaling 321, wherein the processor may be initialized with a default size that may include a certain number of quantum threads 323, each thread including a certain number of quantum circuits 325-329. The scaling may include dynamically adjusting the number of threads and/or circuits based on the present computing task.

Step 341 shows receipt of an indication of a performance outage at primary database 337 which may result in a data loss. At step 343 the system may check control file 345 to determine if the lost data is in the cloud-based backup database. If it is, at step 347 the system may restore the critical data via quantum processor 335 from the backup database in the cloud. Otherwise, if the data is non-critical, it may be backed up in database 339 (which may be a magnetic tape or solid-state non-cloud database, or, in some embodiments, another cloud-based database), and the system may use classical processor 333 to restore the data.

Figure 4:
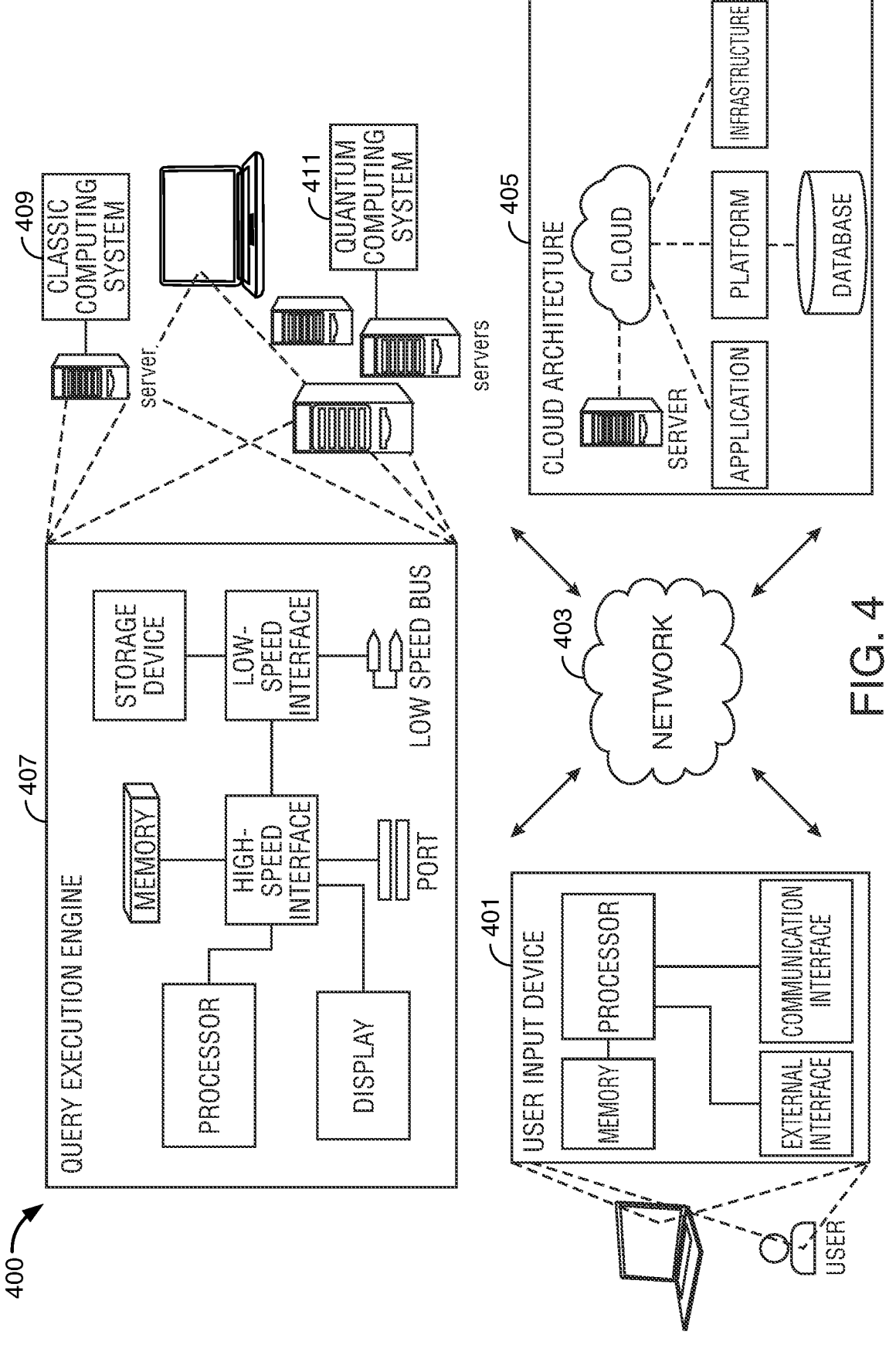
FIG. 4 shows another illustrative diagram in accordance with principles of the disclosure.

FIG. 4 shows illustrative diagram 400 in accordance with principles of the disclosure. Diagram 400 includes user input device 401, cloud architecture 405, and query execution engine 407, some or all of which may be in communication with each other via architecture network 403.

User input device 401 may include a memory, processor, external interface, and communication interface. Cloud architecture 405 may include various servers, applications, platforms, infrastructures, and databases. Query execution engine 407 may include a processor, a display, memory, high- and low-speed interfaces, connection ports, and suitable memory devices and communication busses. The system may include classic computing system 409 and quantum computing system 411, which may execute queries and various computing tasks according to the methods and configurations disclosed herein.

Figure 5A:
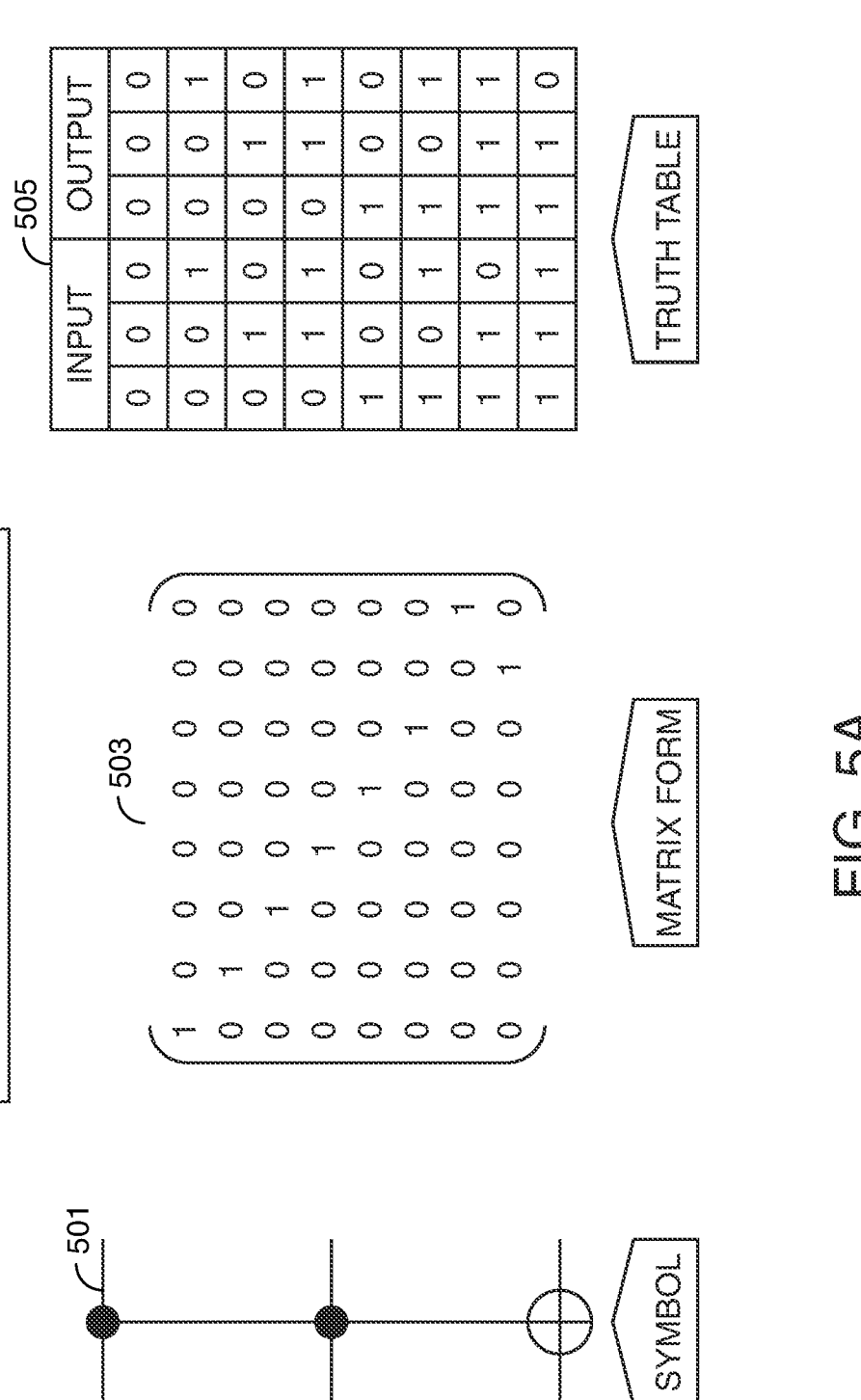
FIGS. 5A-5B show other illustrative diagrams in accordance with principles of the disclosure.
Figure 5B:
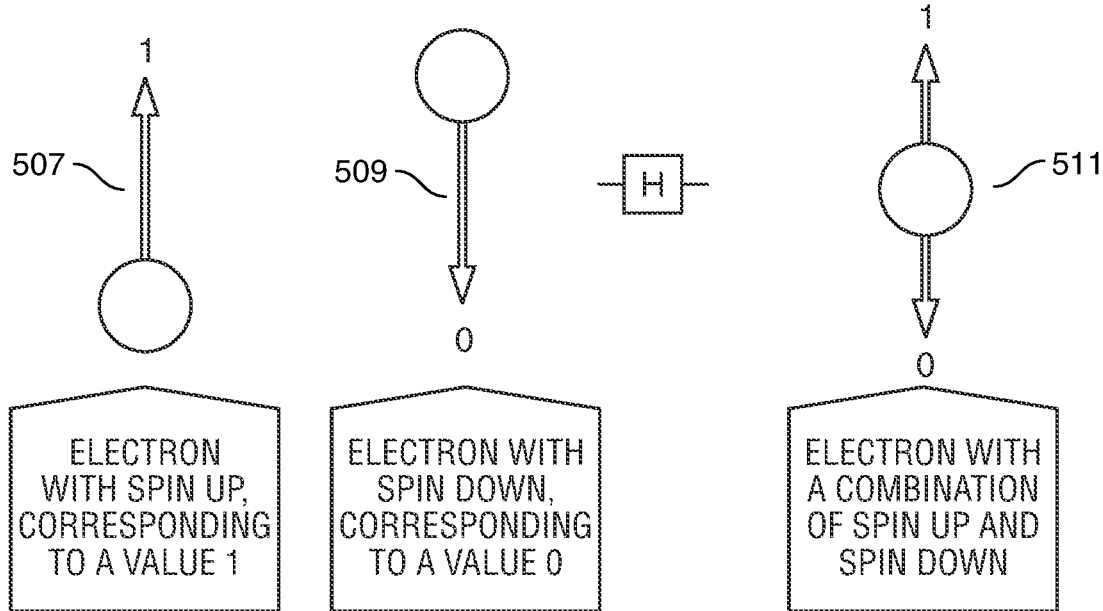

FIGS. 5A-5B show illustrative diagrams of exemplary quantum gates in accordance with principles of the disclosure.

FIG. 5A shows symbol 501, matrix form 503, and truth table 505 of a Toffoli gate. A Toffoli gate is a universal reversible logic gate, which means that it enables simulation of any classical reversible circuit. In operation, as seen in truth table 505, the Toffoli gate has a 3-bit input and a 3-bit outputs. The first two output bits always mirror the first two input bits. The third bit also stays the same unless the first two input bits are both set to 1—in which case the third output bit is inverted from the third input bit. The Toffoli gate is therefore also known as the "controlled-controlled-not" gate.

FIG. 5B shows representations of a Hadamard gate. Symbol 507 shows a representation of electron spin up, which corresponds to the value 1. Symbol 509 shows a representation of electron spin down, which corresponds to the value 0. Symbol 511 shows a representation of electron spin up and down, which corresponds to the value that represents a superposition of 1 and 0.

Figure 6:
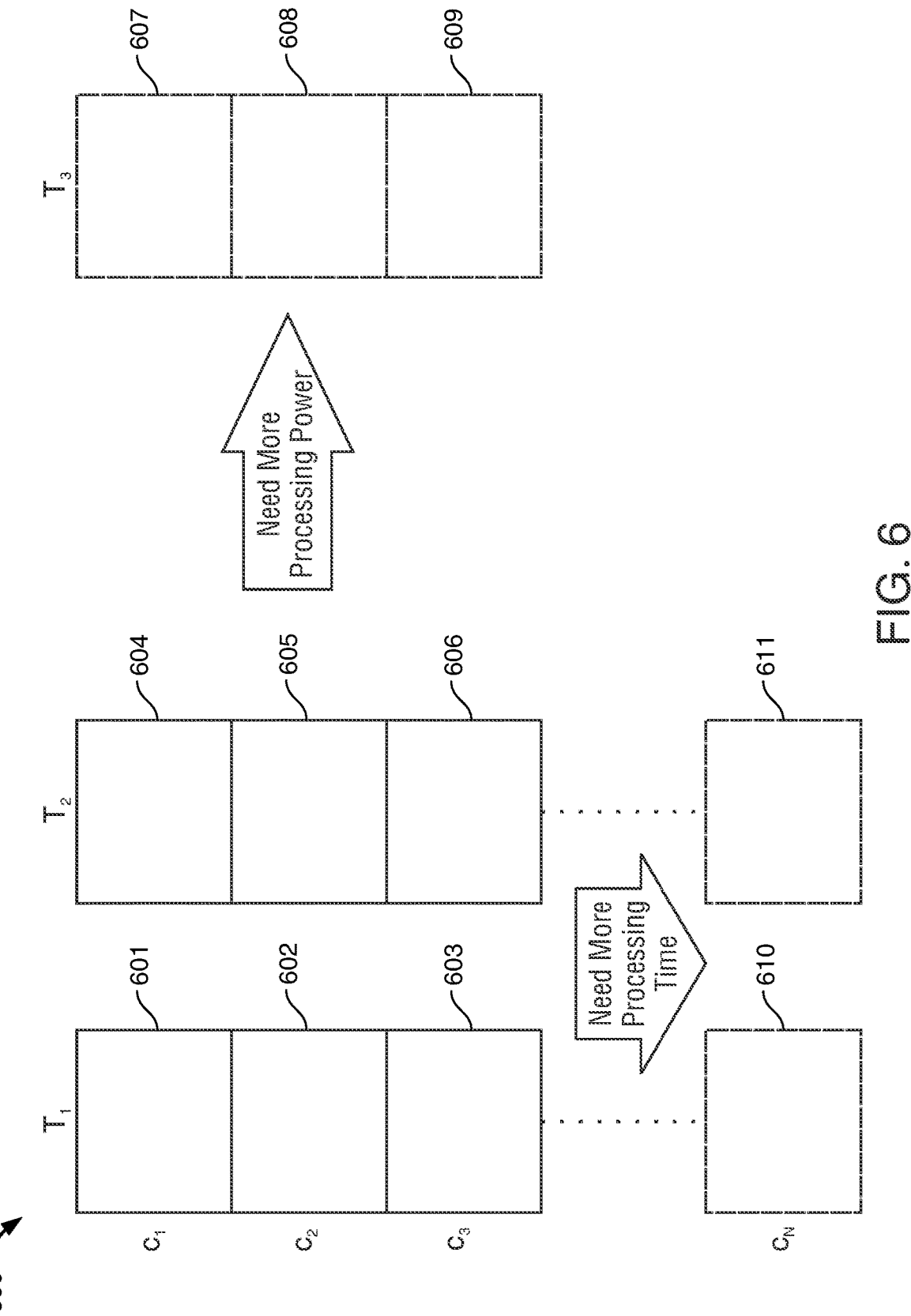
FIG. 6 shows another illustrative diagram in accordance with principles of the disclosure.

FIG. 6 shows illustrative diagram 600 in accordance with principles of the disclosure. Diagram 600 shows scaling of a quantum processor as disclosed herein. In an illustrative default initialization, the quantum processor may include a first quantum thread T1 that includes quantum circuits 1-3 (601-603) and a second quantum thread T2 includes quantum circuits 1-3 (604-606). When the system detects a need for more processing power, a third quantum thread T3 may be added which may include quantum circuits 1-3 (607-609). When the system detects a need for more processing time, a fourth quantum circuit (610 and 611) may be added to each existent thread.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for database backup, search, and recovery using a quantum-computing-powered system with multi-dimensional scaling are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for database backup, search, and recovery using a quantum-computing-powered system with multi-dimensional scaling, the method comprising:

storing a first dataset in a first database that is a local database;

determining, via a machine-learning (ML) engine, a critical subset of the dataset that comprises critical data;

generating a second dataset from the critical subset;

storing the second dataset in a second database that is a remote, cloud-based, database;

receiving a search query at the first database for execution on the first dataset;

generating a first search execution plan suited for a classical processor;

receiving a first indication of an outage at the first database;

in response to the first indication:

routing the search query to a quantum processor comprising a default number of quantum threads, each quantum thread comprising a default number of quantum circuits;

converting the first search execution plan to a second search execution plan suited for the quantum processor; and executing the second search execution plan on the second dataset at the second database via the quantum processor;

receiving a second indication of a loss of data, wherein the loss of data is from the first dataset at the first database; and in response to the second indication, restoring, using the quantum processor, the critical subset of the first dataset at the first database from the second dataset at the second database;

wherein:

the method further comprises automatically scaling the quantum processor during a processing task, said processing task being from a list of processing tasks that includes:

executing the second search execution plan via the quantum processor; and restoring the critical subset of the first dataset using the quantum processor; and said automatically scaling comprises:

adding additional quantum circuits to each quantum thread when the processing task is detected to have a duration that is longer than a threshold duration; and adding additional quantum threads when the processing task is detected to have a volume that is larger than a threshold volume.

2. The method of claim 1 further comprising:

storing a duplicate of the first dataset in a third database;

in response to the second indication, determining whether the lost data is a part of the critical subset; and restoring the lost data to the first database from the duplicate at the third database using a classical processor when the lost data is not part of the critical subset.

3. The method of claim 2 further comprising:

logging, in a cloud-based control file, data stored in the second database; and using the control file as part of the determining whether the lost data is a part of the critical subset.

4. The method of claim 1 further comprising:

in response to the first indication, determining whether the first search execution plan includes searching for data that is part of the critical subset; and only routing the search query to the quantum processor when it is determined that the first search execution plan includes searching for data that is part of the critical subset.

5. The method of claim 1 wherein the converting the first search execution plan to the second search execution plan comprises converting a bit-based search algorithm to a qubit-based search algorithm.

6. The method of claim 1 wherein the ML engine determines the critical subset of the first database at least in part using historical data access frequency patterns.

7. The method of claim 6 wherein the historical data access frequency patterns comprise a threshold access frequency.

8. The method of claim 6 wherein the historical data access frequency patterns comprise a relative access frequency.

9. The method of claim 1 wherein at least one of the quantum circuits comprises a Toffoli gate and at least one of the quantum circuits comprises a Hadamard gate.

10. The method of claim 1 wherein the search query is a SQL search query.

11. A quantum-computing-powered system with multidimensional scaling for database backup, search, and recovery, the system comprising:

a classical processor;

a quantum processor, said quantum processor comprising a default number of quantum threads, each quantum thread comprising a default number of quantum circuits;

a machine-learning (ML) engine;

a first database that is a local database; and a second database that is a remote, cloud-based, database;

wherein the system is configured to:

store a first dataset in the first database;

determine, via the ML engine, a critical subset of the dataset that comprises critical data;

generate a second dataset from the critical subset;

store the second dataset in the second database;

receive a search query at the first database for execution on the first dataset;

generate a first search execution plan suited for the classical processor;

receive a first indication of an outage at the first database;

in response to the first indication:

route the search query to the quantum processor;

convert the first search execution plan to a second search execution plan suited for the quantum processor; and execute the second search execution plan on the second dataset at the second database via the quantum processor;

receive a second indication of a loss of data, wherein the loss of data is from the first dataset at the first database; and in response to the second indication, restore, using the quantum processor, the critical subset of the first dataset at the first database from the second dataset at the second database; and wherein:

the system is further configured to automatically scale the quantum processor during a processing task, said processing task being from a list of processing tasks that includes:

executing the second search execution plan via the quantum processor; and restoring the critical subset of the first dataset using the quantum processor; and to automatically scale the quantum processor during the processing task, the system is further configured to:

add additional quantum circuits to each quantum thread when the processing task is detected to have a duration that is longer than a threshold duration; and add additional quantum threads when the processing task is detected to have a volume that is larger than a threshold volume.

12. The system of claim 11 further configured to:

store a duplicate of the first dataset in a third database;

in response to the second indication, determine whether the lost data is a part of the critical subset; and restore the lost data to the first database from the duplicate at the third database using a classical processor when the lost data is not part of the critical subset.

13. The system of claim 12 further configured to:

log, in a cloud-based control file, data stored in the second database; and use the control file as part of the determining whether the lost data is a part of the critical subset.

14. The system of claim 11 further configured to:

in response to the first indication, determine whether the first search execution plan includes searching for data that is part of the critical subset; and only route the search query to the quantum processor when it is determined that the first search execution plan includes searching for data that is part of the critical subset.

15. The system of claim 11 wherein, to convert the first search execution plan to the second search execution plan, the system is further configured to convert a bit-based search algorithm to a qubit-based search algorithm.

16. The system of claim 11 wherein the ML engine determines the critical subset of the first database at least in part using historical data access frequency patterns.

17. The system of claim 16 wherein the historical data access frequency patterns comprise a threshold access frequency.

18. The system of claim 16 wherein the historical data access frequency patterns comprise a relative access frequency.

19. The system of claim 11 wherein at least one of the quantum circuits comprises a Toffoli gate and at least one of the quantum circuits comprises a Hadamard gate.

20. The system of claim 11 wherein the search query is a SQL search query.

* * * * *